US010281362B2

(12) United States Patent
Hsieh et al.

(10) Patent No.: US 10,281,362 B2
(45) Date of Patent: May 7, 2019

(54) METHOD AND DEVICE OF MEASURING BREAKDOWN STATUS OF EQUIPMENT

(71) Applicant: INDUSTRIAL TECHNOLOGY RESEARCH INSTITUTE, Hsinchu (TW)

(72) Inventors: Tsung-Jung Hsieh, Tainan (TW); Sen-Chia Chang, Hsinchu (TW); Yao-Chung Hsu, Yunlin County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 188 days.

(21) Appl. No.: 14/983,033

(22) Filed: Dec. 29, 2015

(65) Prior Publication Data

US 2017/0146432 A1 May 25, 2017

(30) Foreign Application Priority Data

Nov. 20, 2015 (TW) .............................. 104138459 A

(51) Int. Cl.
G01M 99/00 (2011.01)
G06F 17/11 (2006.01)

(52) U.S. Cl.
CPC ........... *G01M 99/005* (2013.01); *G06F 17/11* (2013.01)

(58) Field of Classification Search
CPC .. G01M 99/005; G06F 17/11; G05B 19/4065; G05B 23/024; H01L 21/67253

(Continued)

(56) References Cited

U.S. PATENT DOCUMENTS 6,397,114 B1  5/2002  Eryurek et al.
6,775,624 B2  8/2004  Storino
(Continued)

FOREIGN PATENT DOCUMENTS

CN   1849599 A    10/2006
CN   101899563 A  12/2010
(Continued)

OTHER PUBLICATIONS

Lee et al., "Development of a Predictive and Preventive Maintenance Demonstration System for a Semiconductor Etching Tool", ECS Transactions, 2013, vol. 52, No. 1, pp. 913-927.

(Continued)

*Primary Examiner* — Mouloucoulaye Inoussa
(74) *Attorney, Agent, or Firm* — Muncy, Geissler, Olds & Lowe, P.C.

(57) ABSTRACT

A breakdown measuring method and a breakdown measuring device are disclosed. The breakdown measuring method includes the following steps: capturing a plurality of process flows, each of the process flows includes at least one recipe step; analyzing a flow attribute corresponding to each of the process flows; capturing sensing data corresponding to the at least one recipe step; generating a local feature in a time interval corresponding to each of the process flows according to the corresponding flow attribute, the corresponding at least one recipe step and the corresponding sensing data; generating a trend distribution according to the local features of the process flows; determining whether to send an alarm information based on the trend distribution.

18 Claims, 18 Drawing Sheets

(58) Field of Classification Search
USPC .......................... 702/182, 108, 189, 81, 183
See application file for complete search history.

(56) References Cited

U.S. PATENT DOCUMENTS

| | | |
|---|---|---|
| 7,406,644 B2 | 7/2008 | Kaushal et al. |
| 8,014,991 B2 | 9/2011 | Mitrovic et al. |
| 8,515,568 B1 | 8/2013 | Achtnig et al. |
| 2002/0156542 A1 | 10/2002 | Nandi |
| 2005/0060103 A1* | 3/2005 | Chamness ............ G05B 23/024 702/30 |
| 2009/0254287 A1 | 10/2009 | Ohgoh |
| 2014/0067324 A1* | 3/2014 | Ho ...................... G05B 19/4065 702/183 |
| 2014/0074258 A1 | 3/2014 | Tsai et al. |
| 2014/0189440 A1 | 7/2014 | Ba |
| 2016/0130727 A1* | 5/2016 | Maruya ................. C30B 25/14 700/270 |

FOREIGN PATENT DOCUMENTS

| | | |
|---|---|---|
| CN | 102282516 A | 12/2011 |
| CN | 101581930 | 7/2012 |
| CN | 103364669 A | 10/2013 |
| CN | 103400308 A | 11/2013 |
| CN | 103681395 A | 3/2014 |
| CN | 103793601 A | 5/2014 |
| TW | 201017447 A | 5/2010 |
| TW | 201241872 A | 10/2012 |
| TW | 201351079 A | 12/2013 |
| TW | 2014826 | 4/2014 |
| TW | 201414826 A | 4/2014 |

OTHER PUBLICATIONS

Lei Yang, "Methodology of Prognostics Evaluation for Multiprocess Manufacturing Systems", A dissertation submitted to the Graduate School of the University of Cincinnati, Jan. 10, 2011, 143 pages.
Su et al., "An Evaluation of the Robustness of MTS for Imbalanced Data", IEEE Transactions on Knowledge and Data Engineering, vol. 19, No. 10, Oct. 2007, pp. 1321-1332.
Chinese Office Action issued in corresponding CN Application No. 201510966602.7, dated Dec. 25, 2018, 7 pages.

* cited by examiner

| Cluster | Min executive time | Max executive time | Min executive temperature | Max executive temperature |
|---|---|---|---|---|
| Cluster 1 | 180 | 2091 | 742.3 | 1613.9 |
| Cluster 2 | 2100 | 49799 | 0 | 1440 |
| Cluster 3 | 120 | 2934 | 0 | 750 |

FIG. 3B

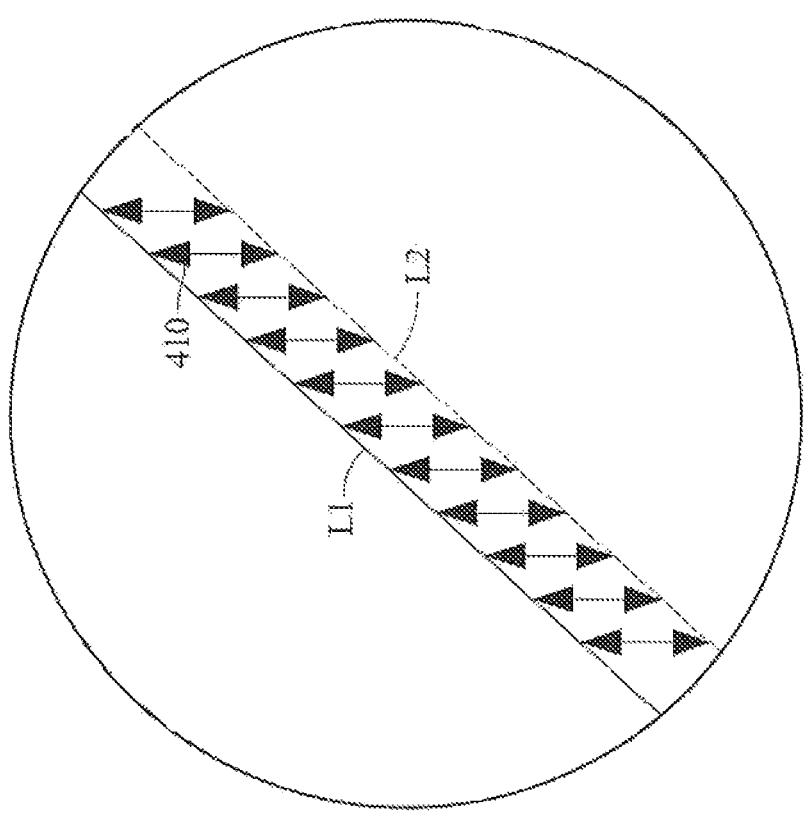

| Number of the process flow | Character-istic value |
|---|---|
| 0109 | 0.6 |
| 0110 | 5.4 |
| 0118 | 4.2 |
| 0120 | 4.1 |
| 0124 | 3.8 |
| 0126 | 3.9 |
| 0.128 | 3.8 |
| 0130 | 3.6 |
| 0133 | 3.9 |
| 0135 | 2.1 |
| 0137 | 4.0 |
| 0139 | 3.7 |
| 0141 | 3.8 |
| .... | .... |

FIG. 5A

| Number of the process run | Average of sliding window |
|---|---|
| 0135 | 3.7 |
| 0141 | 3.655556 |
| 0146 | 3.611111 |
| 0151 | 3.755556 |
| 0154 | 4.1 |
| 0160 | 3.666667 |
| 0170 | 3.7 |
| 0174 | 3.833333 |
| .... | .... |

FIG. 5B

| Number of the process run | NAM | Max | Min | Mean | Kurtosis | Skewness | Std |
|---|---|---|---|---|---|---|---|
| 0135 | 2 | 5.4 | 0.6 | 3.7 | 2.3513 | -1.575 | 1.2027 |
| 0141 | 1 | 4.1 | 2.1 | 3.6555 | 3.3216 | -2.184 | 0.5678 |
| 0146 | 2 | 4 | 2.1 | 3.6111 | 3.6234 | -2.298 | 0.5445 |
| 0151 | 2 | 6.2 | 0.5 | 3.7555 | -0.234 | -0.371 | 1.6323 |
| ..... | ..... | ..... | ..... | ..... | ..... | ..... | ..... |

FIG. 6A

| Number of the process run | Principal component 1 | Principal component 2 | Principal component 3 | Principal component 4 | Principal component 5 | Principal component 6 | Principal component 7 |
|---|---|---|---|---|---|---|---|
| 0135 | -1.723 | -2.155 | 2.106 | 0.452 | -0.059 | -0.189 | -0.148 |
| 0141 | -3.364 | -3.106 | 1.069 | 1.212 | -1.085 | -0.384 | 0.416 |
| 0146 | -2.774 | -3.099 | 1.436 | 1.961 | -1.359 | -0.373 | 0.461 |
| 0151 | -0.711 | -0.099 | 1.114 | -0.925 | 0.804 | -0.037 | -0.453 |
| .... | .... | .... | .... | .... | .... | .... | .... |

FIG. 6B

| | Principal component 1 | Principal component 2 | Principal component 3 | Principal component 4 | Principal component 5 | Principal component 6 | Principal component 7 |
|---|---|---|---|---|---|---|---|
| Eigenvalue | 1.9321 | 1.1783 | 1.1783 | 0.6763 | 0.4888 | 0.1655 | 0.1419 |
| Proportion | 0.3421 | 0.2086 | 0.1886 | 0.1197 | 0.0865 | 0.0293 | 0.0251 |
| Cumulative Proportion | 0.3421 | 0.5507 | 0.7393 | 0.8590 | 0.9456 | 0.9749 | 1.0000 |
| Fisher score | 0.5065 | 0.5884 | 0.5954 | 0.8144 | 0.69 | 0.6837 | 0.7739 |
| Rank | 7 | 6 | 5 | 1 | 3 | 4 | 2 |

FIG. 6C

METHOD AND DEVICE OF MEASURING BREAKDOWN STATUS OF EQUIPMENT

CROSS-REFERENCE TO RELATED APPLICATIONS

This non-provisional application claims priority under 35 U.S.C. § 119(a) on Patent Application No(s). 104138459 filed in Taiwan, R.O.C. on Nov. 20, 2015, the entire contents of which are hereby incorporated by reference.

TECHNICAL FIELD

The disclosure relates to a method and device of measuring a breakdown status of equipment.

BACKGROUND

A conventional method of assessing the breakdown states of semiconductor manufacturing machines or the breakdown states of semiconductor manufacturing machines caused by aging usually depends on either the intensity of electrical signals (e.g. currents or voltages) or parameters (e.g. the quantity of output light) related to these electrical signals. However, this method requires a specific setting for assessing a specific kind of product. Also, it is heavily dependent on the professional knowledge in a related field to interpret the meanings of the above electrical signals or parameters.

Another conventional assessment method depends on individual standard thresholds for a specific manufacturing process, and these individual standard thresholds are pre-defined according to the sensing results of the manufacturing process. However, such predefined standard thresholds cannot be applied to the breakdown assessments of other manufacturing processes. Also, this method is heavily dependent on the many years experience or experimental study of experts in a related field to interpret the assessment result to obtain a malfunction level or an aging level.

SUMMARY

According to one or more embodiments, the disclosure provides a measurement method for breakdown of equipment, which includes the following steps. Acquire process flows. Each of the process flows includes at least one recipe step. Analyze a procedure attribute corresponding to each of the process flows. Acquire sensing information corresponding to the at least one recipe step. Generate a portion feature corresponding to a time period according to the procedure attribute, the at least one recipe step and the sensing information. Establish a trend distribution according to the portion features in the process flows. Determine whether to output a warning message according to the trend distribution.

According to one or more embodiments, the disclosure provides a measurement device for breakdown of equipment. The measurement device includes a process flow capturing unit, an attribute analysis unit, a sensing unit, a feature capturing unit, a trend determination unit and a warning unit. The process flow capturing unit acquires process flows, and each of the process flows includes at least one recipe step. The attribute analysis unit is coupled to the process flow capturing unit and analyzes a procedure attribute corresponding to each of the process flows. The sensing unit captures sensing information corresponding to the at least one recipe step. The feature capturing unit is coupled to the process flow capturing unit, the attribute analysis unit and the sensing unit and generates a portion feature according to the procedure attribute, the at least one recipe step and the sensing information during a time period. The trend determination unit is coupled to the feature capturing unit and establishes a trend distribution according to the portion features of the process flows. The warning unit is coupled to the trend determination unit and determines whether to output a warning message according to the trend distribution.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIGS. 3A and 3B are schematic views of a result of performing a k-means algorithm to all process flows based on a smooth recipe step in an embodiment;

FIG. 4A illustrates a portion feature of the process flow with a rising attribute in an embodiment;

FIG. 5A is a schematic diagram of characteristic values of the process flow that has a rising to steady state attribute and is related to a cluster 1, in a sliding window method in an embodiment;

FIG. 5B is a schematic diagram of first trend values obtained in relation to the sliding window method in FIG. 5A in an embodiment;

FIG. 6A is a schematic diagram of first trend values of various types generated using the characteristic values in FIG. 5A in another embodiment;

FIG. 6B is a schematic diagram of second trend values, corresponding to principal components 1~7 and generated using the first trend values in FIG. 6A, in another embodiment;

FIG. 6C is a schematic diagram of a Fisher score of a maximum value calculated according to a different number of principal components in another embodiment;

DETAILED DESCRIPTION

Figure 1:
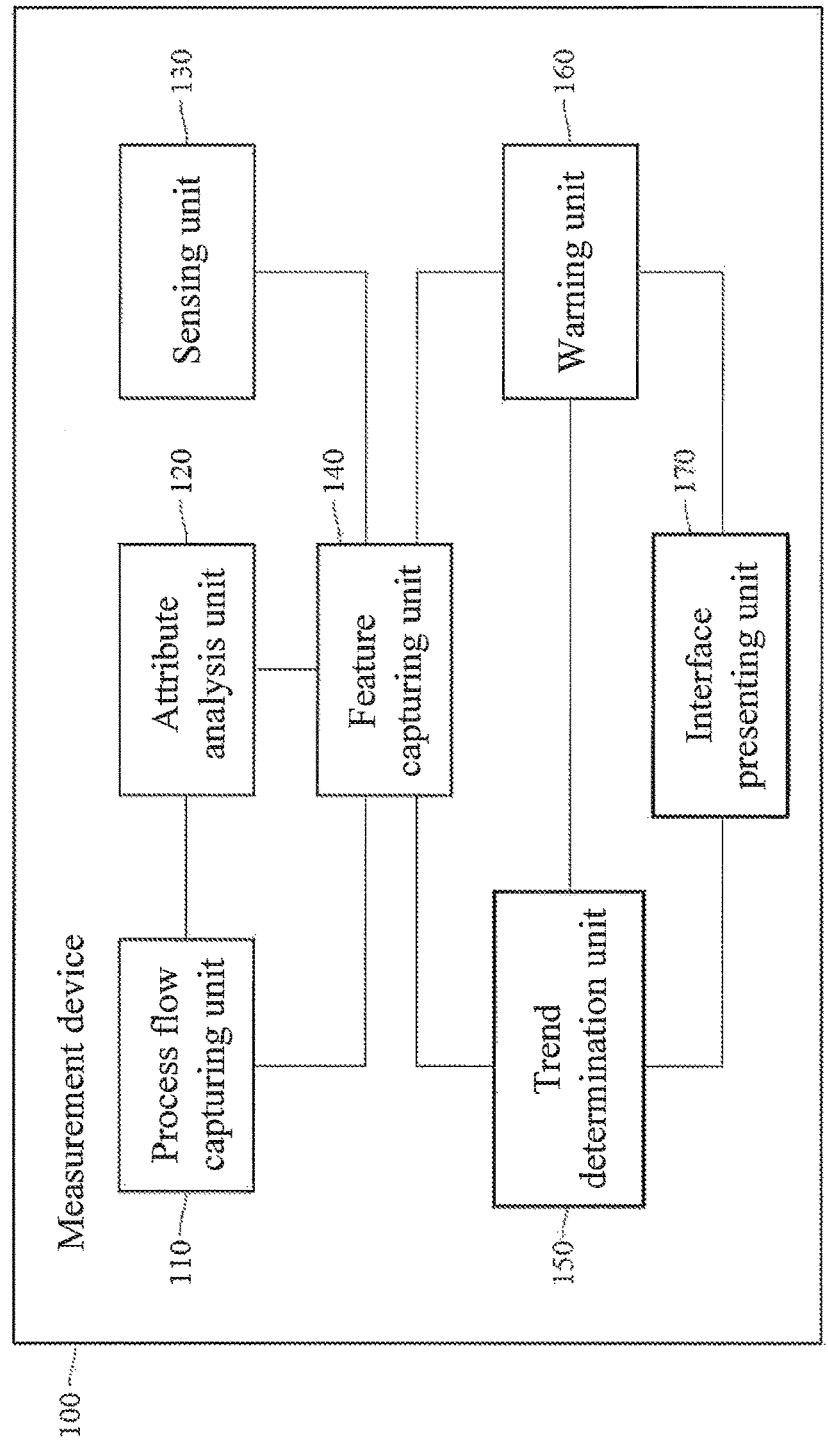
FIG. 1 is a block diagram of a measurement device for the breakdown of equipment in an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a block diagram of a measurement device 100 for the breakdown of equipment in an embodiment. The measurement device 100 is used to measure the breakdown level or aging level of a machine. The measurement device 100 includes a process flow capturing unit 110, an attribute analysis unit 120, a sensing unit 130, a feature capturing unit 140, a trend determination unit 150, a warning unit 160 and an interface presenting unit 170. The attribute analysis unit 120 is coupled to the process flow capturing unit 110, the feature capturing unit 140 is coupled to the process flow capturing unit 110, the attribute analysis unit 120, the sensing unit 130 and the trend determination unit 150, the warning unit 160 is coupled to the trend determination unit 150, and the interface presenting unit 170 is coupled to the trend determination unit 150 and the warning unit 160.

The process flow capturing unit 110, the attribute analysis unit 120, the sensing unit 130, the feature capturing unit 140, the trend determination unit 150 and the warning unit 160 are carried out by, for example, but not limited to, a variety of chips or microprocessors. The interface presenting unit 170 is, for example, but not limited to, a variety of displays.

The process flow capturing unit 110 acquires multiple process flows. For example, a semiconductor manufacturing process of a certain product (i.e. LEDs) includes 2767 process runs, and the process run includes one or more process flows. For the follow-up analysis, the process flow capturing unit 110 acquires the process flows having similar property from the 2767 process runs. This will be described in detail later.

Figure 2:
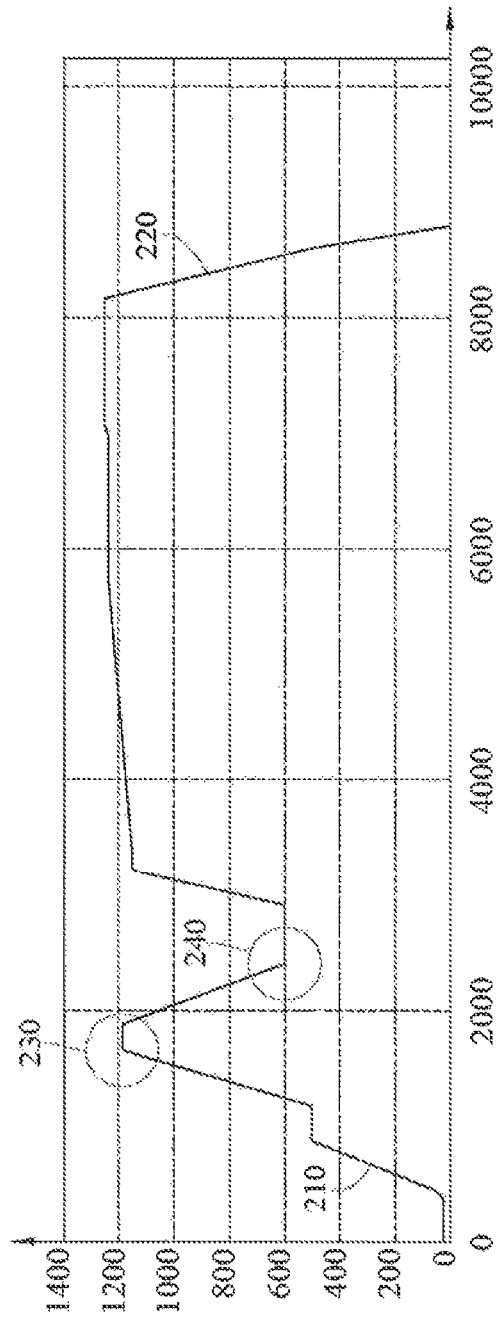
FIG. 2 is a schematic view of a process run in an embodiment.

FIG. 2 is a schematic view of a process run of No. 99 in an embodiment.

In this embodiment, each process flow includes at least one recipe step. The recipe step is categorized into a rising recipe step, a falling recipe step or a smooth recipe step. For example, if the recipe step belongs to a heating step in the semiconductor manufacturing process of LEDs, the rising recipe step is a recipe step related to a temperature rising stage, the falling recipe step is a recipe step related to a cooling stage, and the smooth recipe step is a recipe step related to a thermal preservation stage. Other embodiments may be contemplated in which the recipe step is a formulation related to pressures, flow rates or other parameters. To clarify the disclosure, the following instances of recipe step belong to a heating step in the semiconductor manufacturing process of LEDs.

The recipe step includes multiple setpoints (e.g. heating temperatures at specific time points). Accordingly, the sensing unit 130 acquires sensing information related to the recipe step. The sensing information herein includes sensing values (e.g. temperatures sensed at specific time points).

According to the recipe step, instances of procedure attribute of the process flow are classified into a rising attribute, a falling attribute, a rising to steady state attribute and a falling to steady state attribute. The attribute analysis unit 120 analyzes each process flow to discern that the procedure attribute of each process flow is the rising attribute, the falling attribute, the rising to steady state attribute or the falling to steady state attribute. As shown in FIG. 2, the process run of No. 99 includes a process flow 210 with the rising attribute, a process flow 220 with the falling attribute, a process flow 230 with the rising to steady state attribute, and a process flow 240 with the falling to steady state attribute.

Figure 3A:
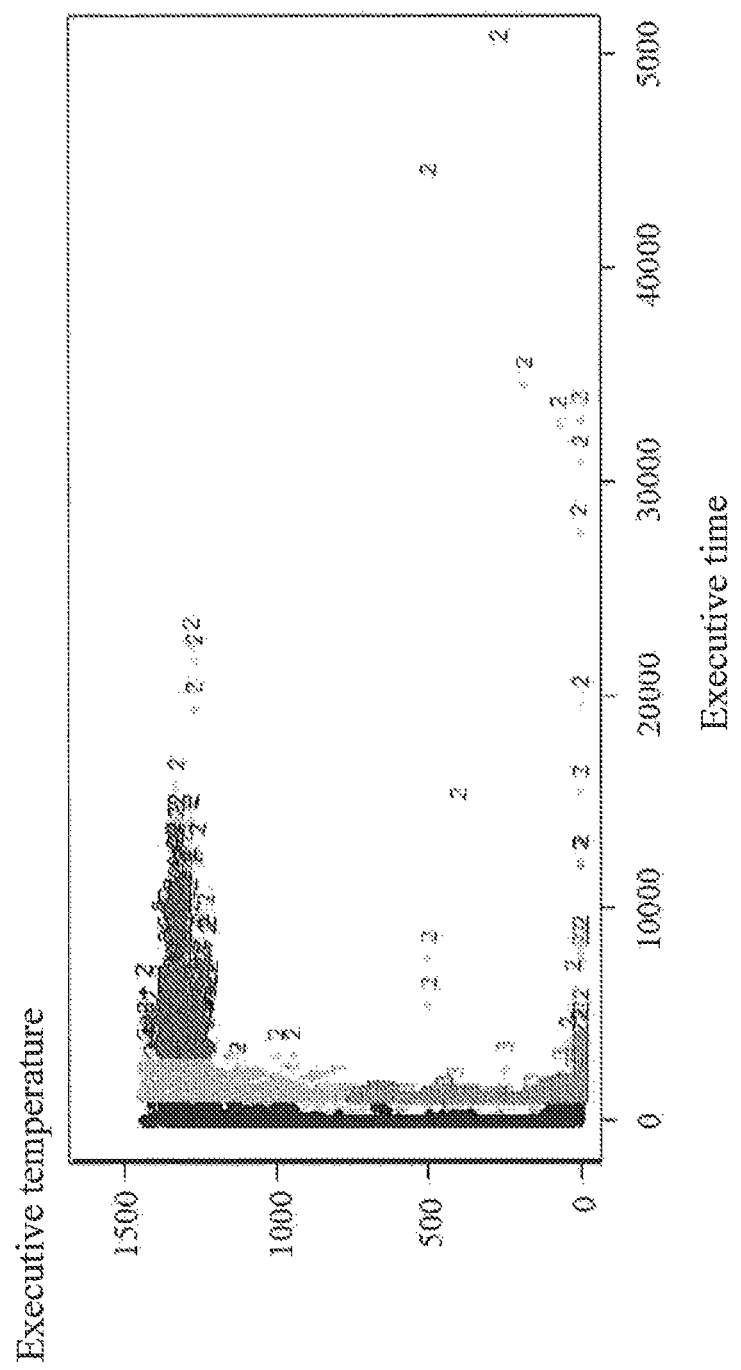

FIGS. 3A and 3B are schematic views of a result of performing a k-means algorithm to all process flows based on a smooth recipe step in an embodiment.

In this embodiment, the acquired process flows are related to the same cluster. For example, the process flow capturing unit 110 acquires the process flows having as similar properties among all the process flows of the 2767 process runs by a clustering algorithm, e.g. a k-means algorithm. Because in the smooth recipe step a product is being manufactured (e.g. a LED is heated to 1200~1400° C. in an epitaxy process), the process flow capturing unit 110 sorts the data of the smooth recipe steps among all the process flows for the follow-up breakdown assessment. This will be described in detail later.

For example, the process flow capturing unit 110, according to the executive temperatures and executive times of all the smooth recipe steps, performs a k-means algorithm. If a k value is set to 3, three clusters, e.g. a cluster 1, a cluster 2 and a cluster 3 as shown in FIGS. 3A and 3B, whose properties are similar, are produced. In FIG. 3A, a point having a label 1 represents the data belonging to the cluster 1, a point having a label 2 represents the data belonging to the cluster 2, and a point having a label 3 represents the data belonging to the cluster 3. Other embodiments may be contemplated in which a different algorithm may be used as the clustering algorithm. Also, to clarify the disclosure, the following process flows are exemplified by the process flows that are acquired by the process flow capturing unit 110 and related to the cluster 1.

The feature capturing unit 140, according to the process flow, the procedure attribute of the process flow, at least one recipe step, and the sensing information, generates a portion feature during a time period. The portion feature indicates a certain malfunction feature. In other words, the portion feature is a basis to recognize a malfunction level.

In this embodiment, the portion feature is related to a deviation level between at least one recipe step and the related sensing information during the time period. Moreover, in an embodiment, the attribute analysis unit 120 further determines that the procedure attribute belongs to the rising attribute, the falling attribute, the rising to steady state attribute or the falling to steady state attribute, and the feature capturing unit 140, according to this determination result, calculates a characteristic value of the related deviation level. Various instances of the recognized procedure attribute are described below.

Figure 4B:
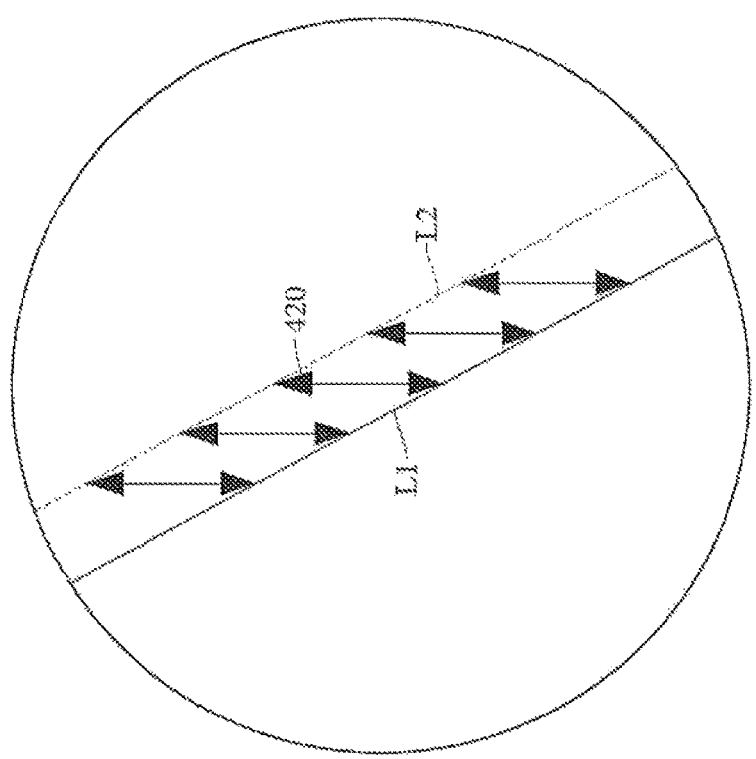
FIG. 4B illustrates a portion feature of the process flow with a falling attribute in an embodiment.
Figure 4C:
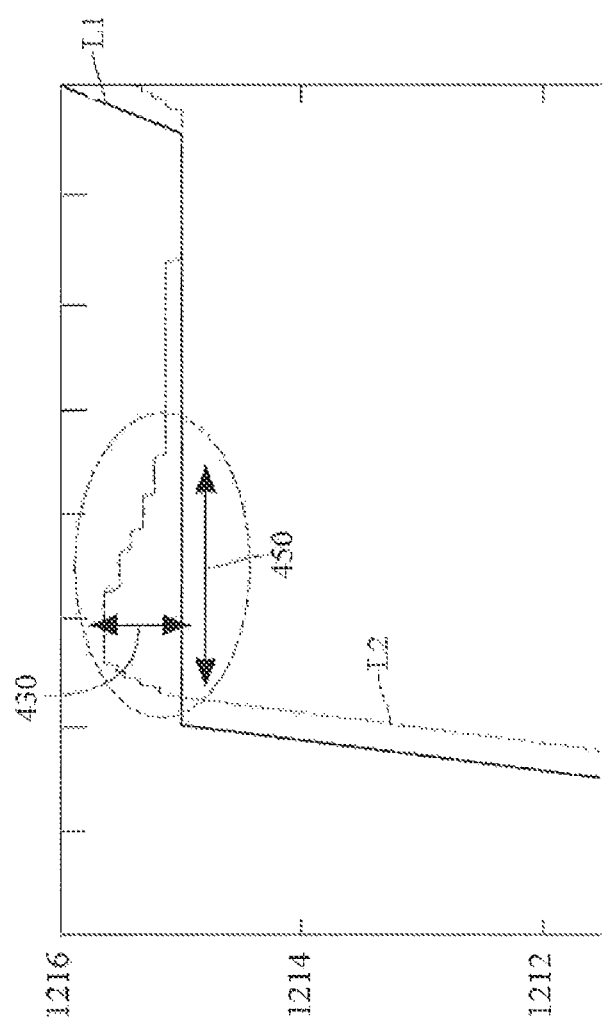
FIG. 4C illustrates two portion features of the process flow with a rising to steady state attribute in an embodiment.
Figure 4D:
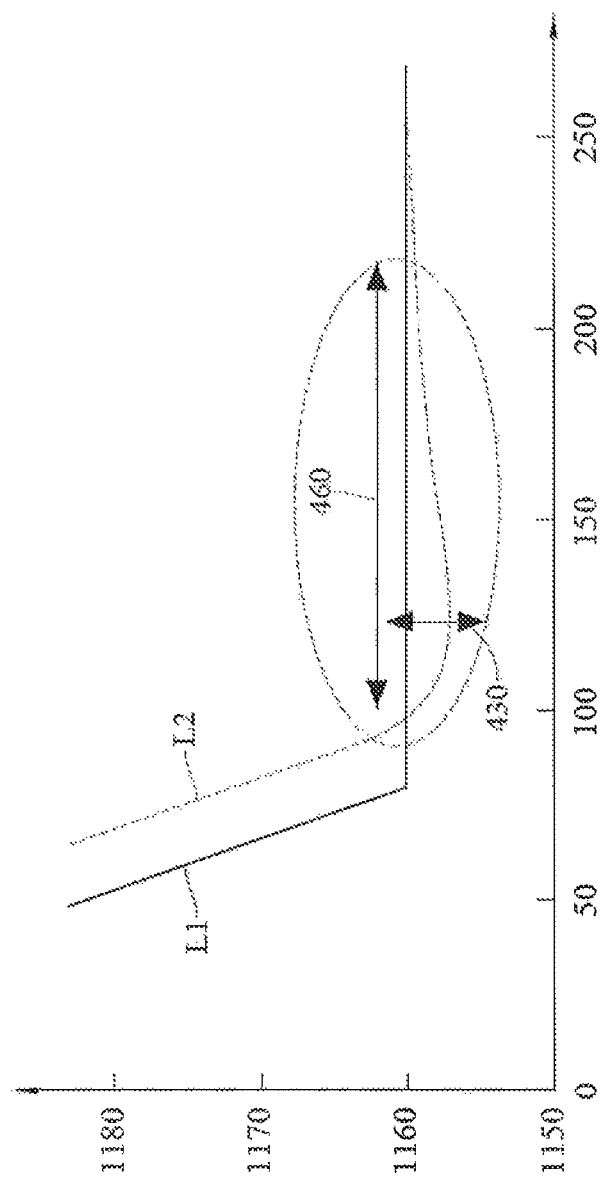
FIG. 4D illustrates two portion features of the process flow with a falling to steady state attribute in an embodiment.

FIGS. 4A~4D are schematic diagrams of a variety if portion features. FIG. 4A illustrates a portion feature of the process flow with a rising attribute in an embodiment, FIG. 4B illustrates a portion feature of the process flow with a falling attribute in an embodiment, FIG. 4C illustrates two portion features of the process flow with a rising to steady state attribute in an embodiment, and FIG. 4D illustrates two portion features of the process flow with a falling to steady state attribute in an embodiment. As shown in FIGS. 4A~4D, the solid line indicated by the label L1 represents setpoints, and the dashed line indicated by the label L2 represents sensing values.

In a situation, when the attribute analysis unit 120 determines that the procedure attribute of the process flow is a rising attribute or a falling attribute, the feature capturing unit 140 calculates an average deviation of deviations between these setpoints and the related sensing values and sets the average deviation as a characteristic value of the related deviation level. For example, if the procedure attribute of the process flow is a rising attribute as shown in FIG. 4A or is a falling attribute as shown in FIG. 4B, a relatively large average deviation of deviations between the setpoints and the related sensing values indicates a relatively high malfunction level. In other words, in a temperature rising stage or a cooling stage, when it is more difficultly for a sensing value to approach the related setpoint, the breakdown is more serious. Therefore, the average deviations (i.e. the characteristic values) in FIGS. 4A and 4B correspond to different portion features 410 and 420 of malfunction, respectively.

In another situation, when the attribute analysis unit 120 determines that the procedure attribute of the process flow is a rising to steady state attribute or a falling to steady state attribute, the feature capturing unit 140 calculates a maximum deviation of deviations between the setpoints and the related sensing values and sets this maximum deviation as an characteristic value of the related deviation level. For example, if the procedure attribute of the process flow is a rising to steady state attribute as shown in FIG. 4C or is a falling to steady state attribute as shown in FIG. 4D, a relatively large maximum deviation of deviations between the setpoints and the related sensing values indicates a relatively high malfunction level. That is, in the duration of heating or cooling down to the thermal preservation stage, when the sensing value is still changing even after approaching the related setpoint, the breakdown is more serious. Accordingly, the maximum deviations (i.e. the characteristic values) in FIGS. 4C and 4D correspond to different portion features 430 and 440 of malfunction, respectively.

In the same situation, other types of characteristic values may be used. When the attribute analysis unit 120 determines that the procedure attribute of the process flow is a rising to steady state attribute or a falling to steady state attribute, the feature capturing unit 140 calculates a deviation time corresponding to the deviations larger than a threshold among all deviations between the setpoints and the related sensing values, and sets this deviation time as a characteristic value of the related deviation level. For example, as shown in FIGS. 4C and 4D, a relatively large deviation time, corresponding to the deviations larger than the threshold among all deviations between the setpoints and the related sensing values, indicates a relatively high malfunction level. In other words, in the duration of heating or cooling down to the thermal preservation stage, when a time period used by the sensing value to achieve a related setpoint is relatively long, the breakdown is more serious. Therefore, the deviation times (i.e. the characteristic values), corresponding to the deviations larger than the threshold in FIGS. 4C and 4D, correspond to different portion features 450 and 460 of malfunction, respectively.

Note that since the executive times of the process flows belonging to the cluster 1 are relatively short (e.g. the executive times are in a range from 180 seconds to 2091 seconds) and the executive temperatures are relatively high (e.g. the executive temperatures are in a range from 742.3° C. to 1613° C.), it is quite suitable to use the cluster 1 to calculate the portion features corresponding to the process flows with the rising to steady state attribute.

As described above, the epitaxy process generally requires that LEDs are heated to a temperature ranging from 1200° C. to 1400° C. Therefore, in an embodiment, when the cluster 1 is predeterminedly used to calculate portion features of process flows with the rising to steady state attribute, the process flow, where the temperature is lower than 1200° C., will be eliminated in order to enhance the accuracy of breakdown assessment. That is, the accumulated energy in the process flow, where the temperature is higher than or substantially equal to 1200° C. and which has the rising to steady state attribute and belongs to the cluster 1, is sufficient, so such abnormal situations (e.g. the sensing value of the malfunctioned machine changes unceasingly or requires a longer time to approach the related setpoint) may obviously be exposed.

Figure 5C:
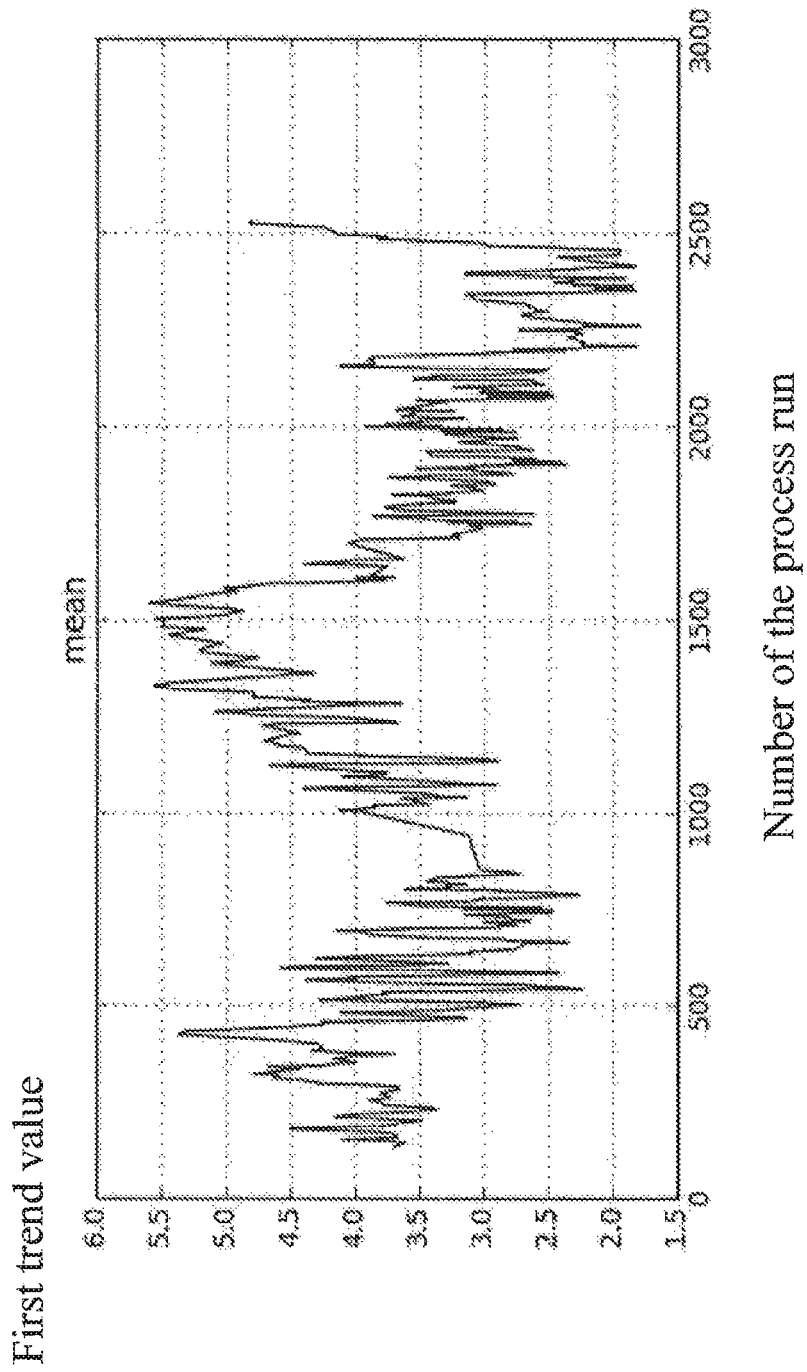
FIG. 5C is a schematic diagram of a trend distribution established according to the first trend values in FIG. 5B in an embodiment.

FIG. 5A is a schematic diagram of characteristic values of the process flow that has a rising to steady state attribute and is related to a cluster 1, in a sliding window method in an embodiment, FIG. 5B is a schematic diagram of first trend values obtained in relation to the sliding window method in FIG. 5A in an embodiment, and FIG. 5C is a schematic diagram of a trend distribution established according to the first trend values in FIG. 5B in an embodiment.

The trend determination unit 150 establishes a trend distribution and a related warning threshold according to multiple portion features of the process flows. Specifically, in this embodiment, the trend determination unit 150 performs a smoothing process to each of the characteristic values to obtain a respective first trend value, and obtains the trend distribution and the related warning threshold according to the first trend values.

For example, as shown in FIG. 5A, No. 0109, No. 0110, No. 0118, No. 0120, No. 0124, No. 0126, No. 0128, No. 0130, No. 0133, No. 0135, No. 0137, No. 0139, No. 0141 and other serial numbers not shown in the drawing are serial numbers of the process flows belonging to the cluster 1. The smoothing process herein is using the sliding window method to obtain the first trend value. In FIG. 5B, a related average is set as the first trend value.

In the sliding window method as shown in FIG. 5A, the trend determination unit 150 sets a window length N to be 10 and a shift length n to be 3, and then a first trend value of the average type is obtained as shown in FIG. 5B. The average value, which is acquired when the sliding window is at a position 510, corresponds to the process flow of No. 0135, and the average value, which is acquired when the sliding window is at a position 520, corresponds to the process flow of No. 0141. The detailed description of the correlation between the rest of the process flows (such as No. 0146, 0154, 0160 and so on) and the movement of the sliding window to other positions according to the shift length may be referred to the previous description and thus, will not be repeated hereinafter.

Next, the trend determination unit 150 depicts a trend distribution according to the first trend values, as shown in FIG. 5C, and displays this trend distribution by the interface presenting unit 170. The warning unit 160, according to the trend distribution, determines whether to output a warning message. In this or some embodiments, the interface presenting unit 170 displays a known malfunctioning component replacing time point in addition to displaying the trend distribution.

Figure 6D:
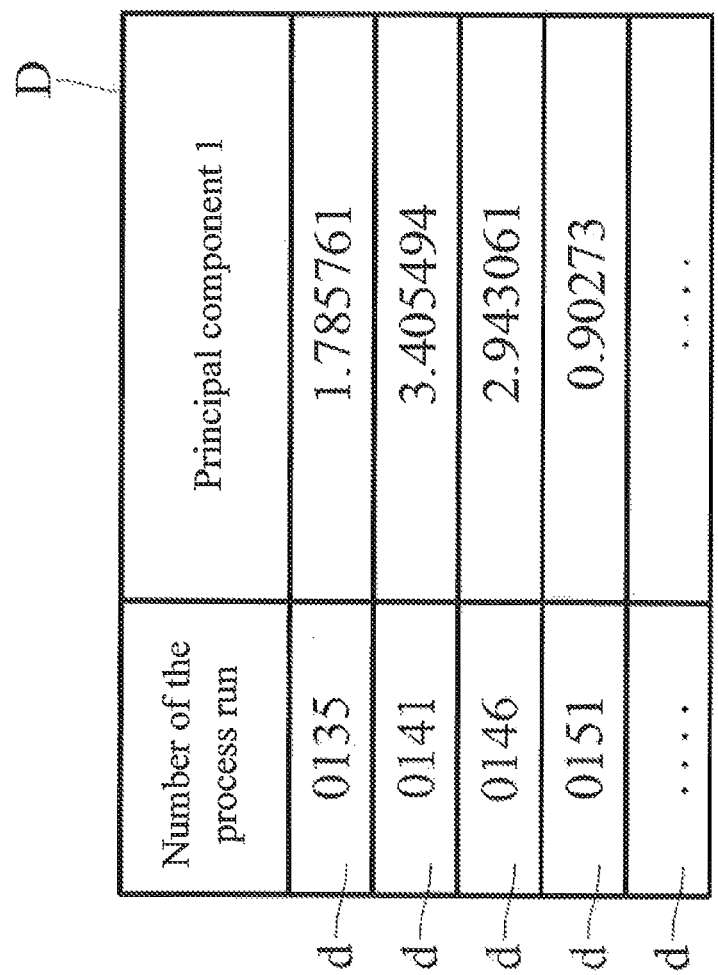
FIG. 6D is a schematic diagram of a Mahalanobis distance array D generated according to the Fisher score of the maximum values in another embodiment.
Figure 6E:
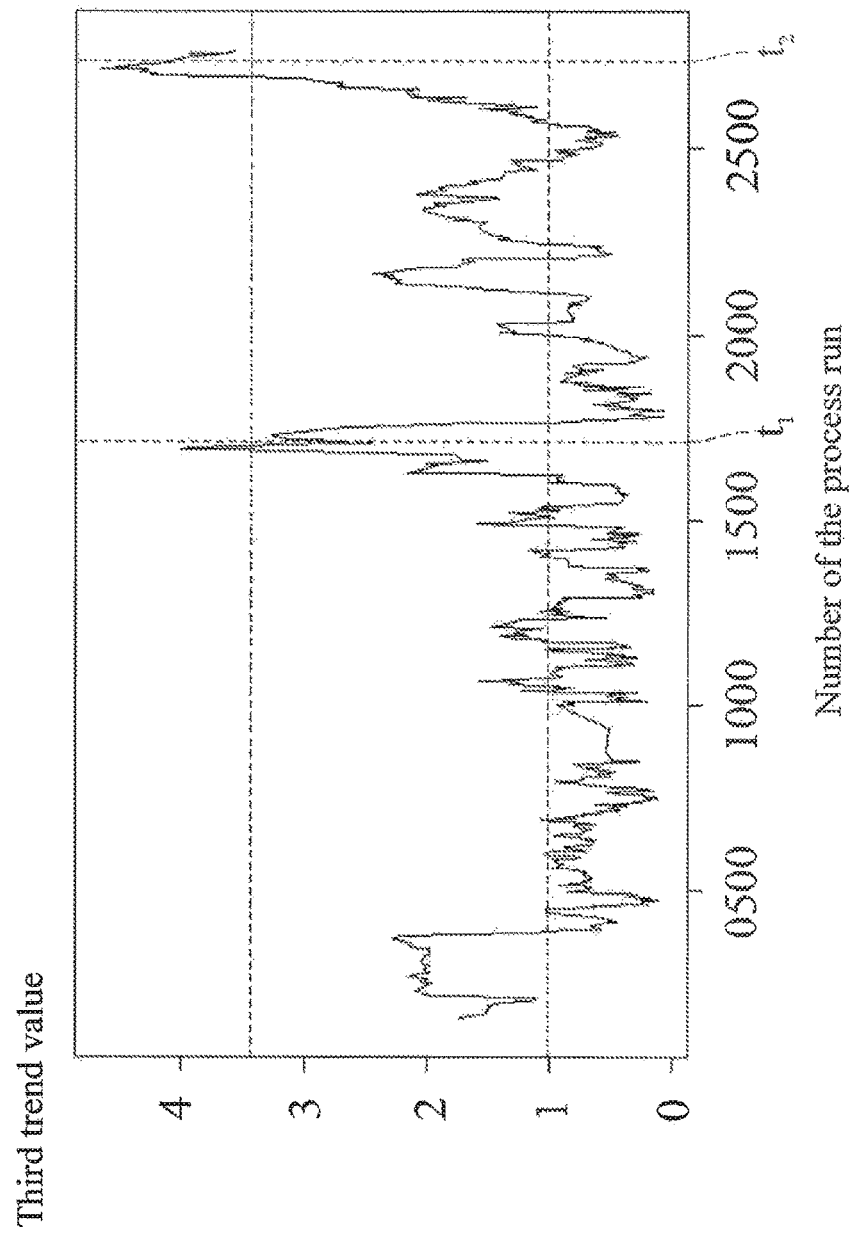
FIG. 6E is a schematic diagram of a trend distribution established according to the Mahalanobis distance array D in another embodiment.
Figure 6F:
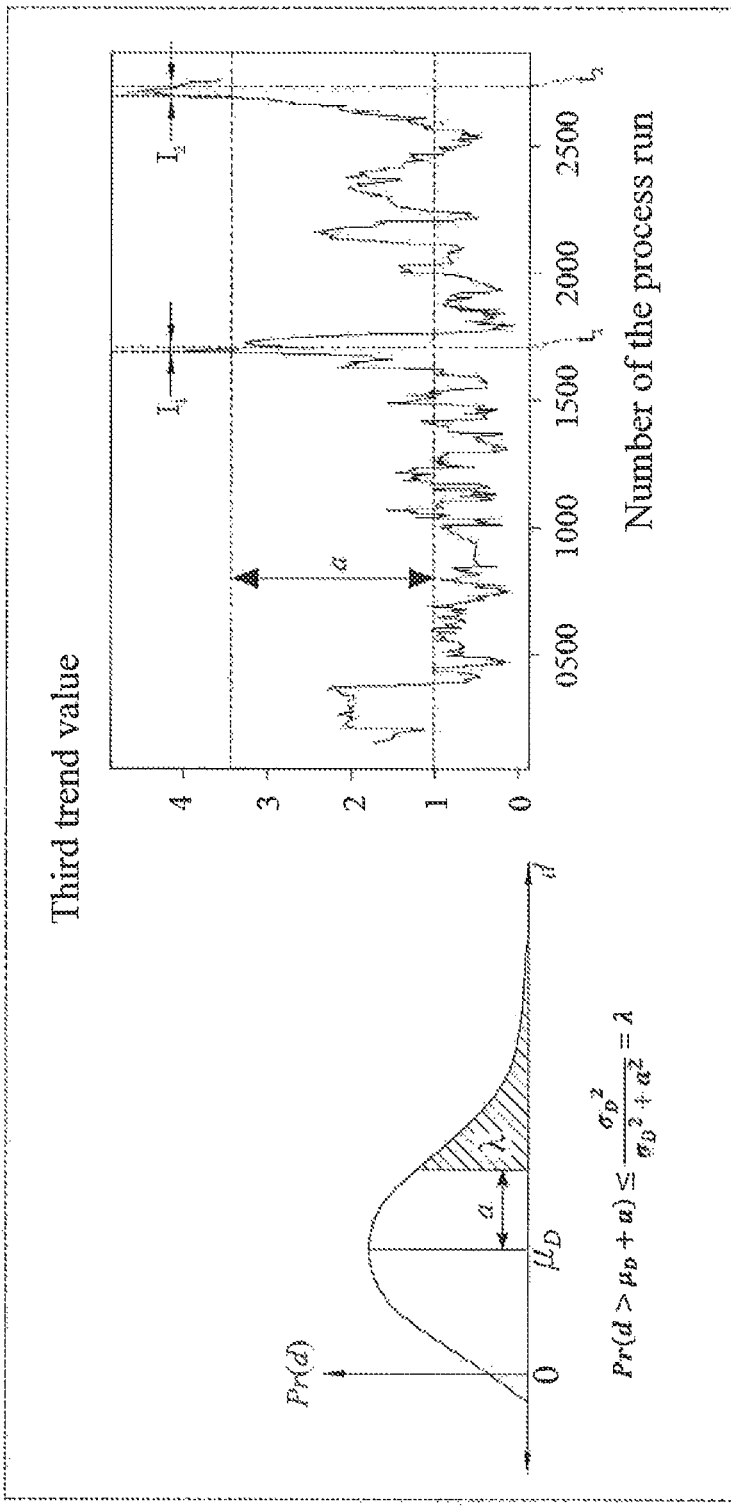
FIG. 6F is a schematic diagram of a warning threshold generated using the trend distribution in another embodiment.

FIG. 6A is a schematic diagram of first trend values of various types generated using the characteristic values in FIG. 5A in another embodiment, FIG. 6B is a schematic diagram of second trend values, corresponding to principal components 1~7 and generated using the first trend values in FIG. 6A, in another embodiment, FIG. 6C is a schematic diagram of a Fisher score of a maximum value calculated according to a different number of principal components in another embodiment, FIG. 6D is a schematic diagram of a Mahalanobis distance array D generated according to the Fisher score of the maximum values in another embodiment, FIG. 6E is a schematic diagram of a trend distribution established according to the Mahalanobis distance array D in another embodiment, and FIG. 6F is a schematic diagram of a warning threshold generated using the trend distribution in another embodiment.

In this embodiment, the trend determination unit 150 establishes a trend distribution and a related warning threshold according to the portion features of the process flows. Specifically, in this embodiment, the trend determination unit 150 performs the smoothing process to each of the characteristic values to obtain an individual first trend value of a different type. For example, as shown in FIG. 6A, the trend determination unit 150 performs the sliding window method according to the characteristic values in FIG. 5A to calculate the first trend values belonging to different types, such as minimum (Min), maximum (Max), mean, skewness, kurtosis, standard deviation (Std) and number of above mean (NAM), respectively.

The trend determination unit 150 performs a space transformation to these first trend values of different types to obtain related second trend values of different types. For example, the trend determination unit 150 performs a principal component analysis (PCA) to the first trend values of multiple types in FIG. 6A to map these first trend values onto a principal component space, and thus, the second trend values respectively corresponding to the principal components 1~7 in FIG. 6B are obtained.

The trend determination unit 150 performs a dimensionality reduction to the second trend values corresponding to the principal components to obtain third trend values. For example, the trend determination unit 150 calculates a Fisher score for each principal component and, according to the maximum Fisher score, determines the amount of principal components to use. As shown in FIG. 6C, the trend determination unit 150 calculates the eigenvalues, proportions and cumulative proportions of the principal components 1~7. The proportion herein is obtained by dividing a sum of all eigenvalues by a related eigenvalue. For example, the proportion of the principal component 1 is 0.34208 (i.e. 1.9321/(1.9321+1.1783+1.0652+0.6763+0.4888+0.1655+0.1419)=0.34208). The cumulative proportions herein are obtained by accumulating the proportions from left to right. As shown in FIG. 6C, the eigenvalue at the left side is relatively large as compared to the eigenvalue at the right side, and this indicates that the principal component corresponding to the eigenvalue at the left side has a relatively high ability of interpreting the variability of original data (e.g. the data in FIG. 6A) as compared to the principal component corresponding to the eigenvalue at the right side.

Then, the trend determination unit 150 will learn that the principal component 4 has the maximum Fisher score and thus, has a rank of 1. Specifically, the Fisher score is a distribution distance determination index for two categories of samples. When the Fisher score is relatively large, the current two categories of data have a relatively large difference in distribution distance therebetween. Therefore, the trend determination unit 150 can, according to the Fisher score, determine the amount of principal components to use. Specifically, the calculation of a Fisher score needs to consider both the within-class scatter and the between-class scatter of two categories. A maximum Fisher score indicates a maximum proportion between the between-class scatter and the entire within-class scatter. In other words, when the within-class scatter (i.e. an individual group) is relatively small and the between-class scatter is relatively large (i.e. the difference between two categories), the trend determination unit 150 will obtain the amount of principal components to use, which is 4.

In this embodiment, the above two categories of data are two types of trend values before and after a time point of component replacement, respectively.

Accordingly, the trend determination unit 150 may calculate a Mahalanobis distance array (Mahalanobis distance matrix) D corresponding to the front 4 principal components, since the Mahalanobis distance array D is the most representative tendency data among the process flows. In other words, when a machine malfunctions or has aged, the tendency data generated by the front 4 principal components will express the machine's variation the most. A Mahalanobis distance array D includes multiple Mahalanobis distances d (i.e. the third trend values).

In details, the trend determination unit 150 calculates data Y according to the mapping data in FIG. 6B. The data Y is projection data constituted by the front N pieces of principal component having relatively large variance among the principal components 1~7. The trend determination unit 150 calculates the Mahalanobis distance d of each piece of data y in the data Y by the following equation:

$$d = \sqrt{(y-\bar{y})'(S)^{-1}(y-\bar{y})},$$

where S represents a covariance matrix of all projections in the data y, and $\bar{y}$ is 0. Finally, the Mahalanobis distance array D corresponding to the front 4 principal components may be obtained, as shown in FIG. 6D. Each element in the Mahalanobis distance array D is a third trend value. The trend determination unit 150 uses these third trend values to depict the trend distribution as shown in FIG. 6E.

The warning unit 160 generates a warning threshold according to the trend distribution and compares the trend distribution with the warning threshold to determine whether to output a warning message. For example, the warning unit 160 uses a Cantelli inequality $$Pr(d > \mu_D + a) \leq \frac{\sigma_D^2}{\sigma_D^2 + a^2} = \lambda$$

to generate a warning threshold T, as shown in FIG. 6F. $\mu_D$ represents a standard deviation of all values in the array D, $\lambda$ is set as 0.05, and a represents a tolerance value higher than $\mu_D$. When the warning unit 160 determines that in the trend distribution a data point exceeds $T=\mu_D+a$, a warning message will be outputted. The production method of the warning threshold herein may also be used in the trend determination unit 150 in an embodiment, and other embodiments may be contemplated in which the trend determination unit 150 generates the warning threshold by other methods.

The interface presenting unit 170 is coupled to the trend determination unit 150 and the warning unit 160 and displays the above clusters, trend distribution, warning threshold, characteristic values, first trend values, second trend values, third trend values and/or the information about a warning message.

For example, the interface presenting unit 170 shows the above data in an interface by which a user may check them. Instances of the above data include recipe steps, the parameter (e.g. temperature, pressure, flow rate or other parameters) used in the recipe step, process flows, the procedure attribute of the process flow, the clustering diagrams of clusters, Fisher scores, principal components, tendency diagrams, a warning threshold, the time point of outputting a warning message, or other relevant data, such as replacing time points of known malfunctioned components.

Moreover, the user can, through what the interface shows, learn how many possible trend distributions may be used to assess the breakdown state. For example, assume that only one recipe step parameter (e.g. temperature) is in use, and the clustering algorithm in use supports 3 clusters (as shown in FIGS. 3A~3B), characteristic values of 6 kinds of portion features (as shown in FIGS. 4A~4D), 7 types of first trend values (e.g. the minimum value, the maximum value, the average value, the skewness, the kurtosis, the standard deviation and the number of averages). Then, there are 126 (i.e. 1*3*6*7=126) possible trend distributions to present the breakdown state of a machine.

In this embodiment, through the breakdown assessment and warning of the measurement device 100 as shown in FIG. 6F, the outputting of a warning message at is possibly advanced by 36 process runs in the breakdown assessment result as compared to a known component replacing time point t1 (i.e. the process run of No. 1628). Alternatively, the outputting of a warning message is possibly advanced by 44 process runs in the breakdown assessment result as compared to a known component replacing time point t2 (i.e. the process run of No. 2734), as shown by the period $I_2$ in FIG. 6F. Therefore, the measurement device 100 may efficiently avoid the cost of lose, which is caused by replacing a component after the component has malfunctioned.

Figure 7:
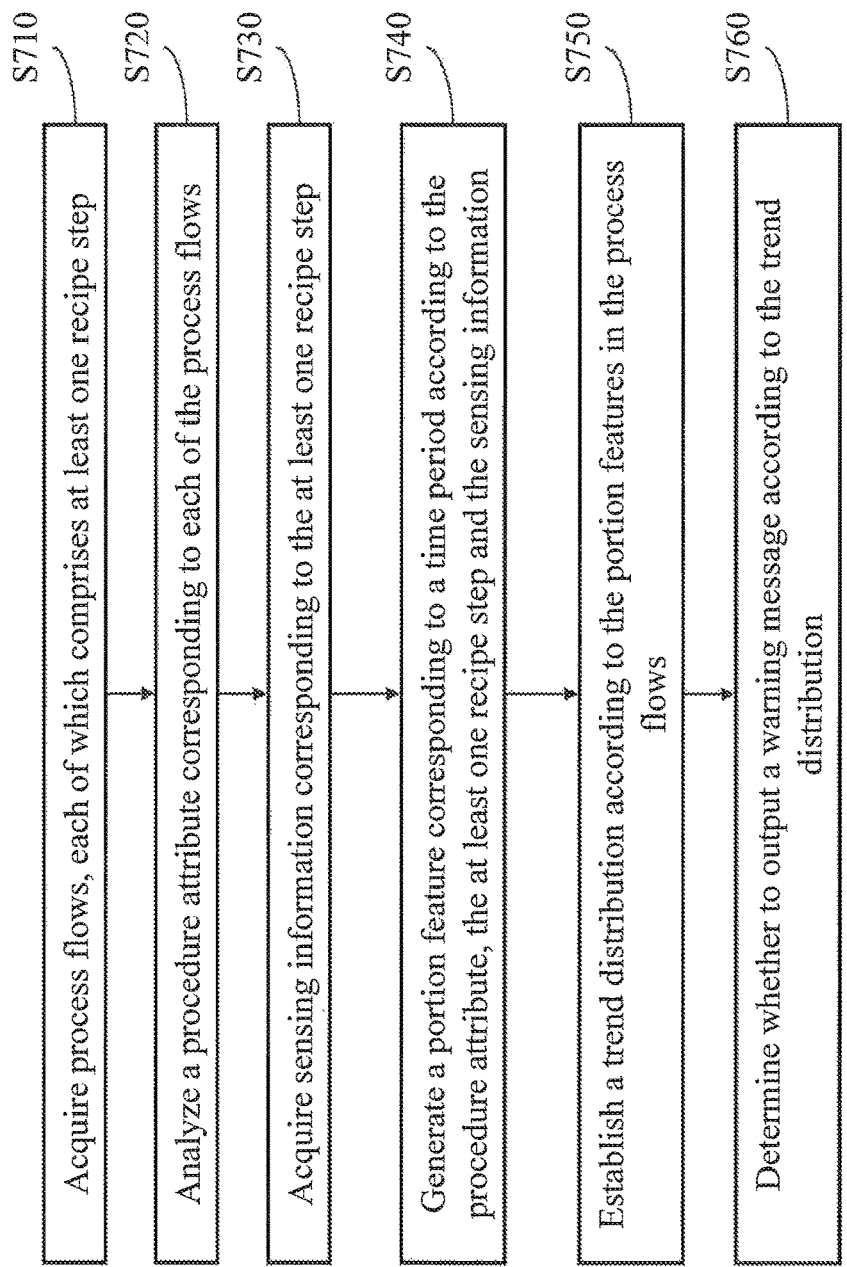
FIG. 7 is a flow chart of a measurement method for the breakdown of equipment in an embodiment.

FIG. 7 is a flow chart of a measurement method for the breakdown of equipment in an embodiment. The measurement method for the breakdown of equipment includes steps S710~S750. In step S710, the process flow capturing unit 110 acquires process flows, and each of the process flows includes at least one recipe step. In step S720, the attribute analysis unit 120 analyzes a procedure attribute of each of the process flows. In step S730, the sensing unit 130 acquires sensing information corresponding to the at least one recipe step. In step S740, the feature capturing unit 140 generates portion features according to the procedure attributes, at least one recipe step and the sensing information during a time period. In step S750, the trend determination unit 150 establishes a trend distribution according to the portion features of the process flows. In step S760, the warning unit 160, according to the trend distribution, determines whether to output a warning message. These steps have been described above in detail and thus, they will not be repeated hereinafter.

As described above, the disclosure determines that the procedure attribute of each of the process flows belonging to the same cluster is a rising attribute, a falling attribute, a rising to steady state attribute or a falling to steady state attribute, so as to calculate a characteristic value of a portion feature indicating the deviation level of each process flow. In an embodiment, a smoothing process is performed to these characteristic values to obtain first trend values which are used to establish a trend distribution. In another embodiment, a smoothing process is performed to these characteristic values to obtain multiple types of first trend values, and a space transformation and a dimensionality reduction are performed to the first trend values to obtain third trend values, which are very suitable to represent malfunction levels and may be used to establish a trend distribution. Moreover, in an embodiment, a warning threshold is generated according to the trend distribution, and the comparison between the trend distribution and the warning threshold triggers whether a warning message is outputted or not. During the assessment of breakdown status, the breakdown assessment may automatically be performed by recognizing the portion features at a specific time point or in a specific time period according to according to the attribute of each process flow after recipe steps and the sensing data are acquired. Therefore, the disclosure may be applied to the manufacturing process of a variety of products and is able to be compatible to manufacturing formulations where a variety of different parameters (e.g. temperature, pressure and/or flow rate) is used. It may be possible to provide a common assessment standard and a friendly interface according to a variety of products or manufacturing processes.

What is claimed is:

1. A measurement method for breakdown of equipment, with the measurement method performed by a breakdown measurement device, the breakdown measurement comprising a process flow capturing circuit, an attribute analysis circuit, a sensing circuit, a feature capturing circuit, a trend determination circuit and a warning circuit, and the measurement method comprising:

acquiring process flows, by the process flow capturing circuit, each of which comprises at least one recipe step;

for each of the at least one recipe step, determining whether each of the at least one recipe step is a rising recipe step, a falling recipe step or a smooth recipe step by the attribute analysis circuit, each of the at least one recipe step comprising setpoints;

determining a procedure attribute for each of the at least one recipe step, by the attribute analysis circuit, the procedure attribute being one of a rising attribute, a falling attribute and a rising to steady state attribute and a falling to steady state attribute for the rising recipe step, the falling recipe step and the smooth recipe step;

acquiring sensing information for each of the at least one recipe step by the sensing circuit, the sensing information comprising sensing values;

calculating a deviation level between the setpoints and the sensing values during the time period and setting a characteristic value corresponding to the deviation level by the feature capturing circuit;

generating a portion feature corresponding to a time period by comparing the procedure attribute for each of the at least one recipe step and the sensing information corresponding to each of the at least one recipe step, by the feature capturing circuit, the portion feature being the deviation level between procedure attribute for each of the at least one recipe step and the sensing information during the time period;

establishing a trend distribution according to the portion feature in the process flows by the trend determination circuit; and determining whether to output a warning message according to the trend distribution by the warning circuit.

2. The measurement method according to claim 1, wherein generating the portion feature further comprises: when the procedure attribute is either the rising attribute or the falling attribute, calculating an average deviation of deviations between the setpoints and the sensing values during the time period and setting the average deviation as the characteristic value corresponding to the deviation level.

3. The measurement method according to claim 1, wherein generating the portion feature further comprises: when the procedure attribute is either the rising to steady state attribute or the falling to steady state attribute, calculating a maximum deviation among the deviations between the setpoints and the sensing values during the time period and setting the maximum deviation as the characteristic value corresponding to the deviation level.

4. The measurement method according to claim 3, wherein generating the portion feature further comprises:

when the procedure attribute is either the rising to steady state attribute or the falling to steady state attribute, calculating a deviation time, which corresponds to the deviations larger than a threshold during the time period, and setting the deviation time as the characteristic value corresponding to the deviation level.

5. The measurement method according to claim 1, wherein the process flows are related to a same cluster obtained by performing a clustering algorithm to process flows of process runs.

6. The measurement method according to claim 5, wherein determining whether to output the warning message according to the trend distribution comprises:
generating a warning threshold according to the trend distribution; and
comparing the trend distribution with the warning threshold to determine whether to output the warning message.

7. The measurement method according to claim 6, wherein establishing the trend distribution according to the portion feature in the process flows comprises:
performing a smoothing process to the characteristic value to obtain first trend values; and
wherein determining whether to output the warning message according to the trend distribution comprises:
establishing the trend distribution and the warning threshold related to the trend distribution according to the first trend values.

8. The measurement method according to claim 7, wherein establishing the trend distribution and the warning threshold according to the portion feature in the process flows comprises:
performing the smoothing process to the characteristic value to obtain the first trend values of various types;
performing a space transformation to the first trend values to obtain second trend values that correspond to principal components respectively;
performing a dimensionality reduction to the second trend values of the principal components to obtain third trend values; and
obtaining the trend distribution according to the third trend values.

9. The measurement method according to claim 8, further comprising:
displaying a clustering diagram, the trend distribution, the warning threshold, the characteristic value, the first trend values, the second trend values, the third trend values or the warning message related to the cluster in an interface.

10. A measurement device for breakdown of equipment, comprising:
a process flow capturing circuit configured to acquire process flows, each of which comprises at least one recipe step, and to determine whether each of the at least one recipe step is a rising recipe step, a falling recipe step or a smooth recipe step;
an attribute analysis circuit coupled to the process flow capturing circuit and configured to determine a procedure attribute for each of the at least one recipe step, the procedure attribute being one of a rising attribute, a falling attribute and a rising to steady state attribute and a falling to steady state attribute for the rising recipe step, the falling recipe step and the smooth recipe step, each of the at least one recipe step comprising setpoints;
a sensing circuit configured to capture sensing information corresponding to the at least one recipe step, the sensing information comprising sensing values;
a feature capturing circuit coupled to the process flow capturing circuit, the attribute analysis circuit and the sensing circuit and configured to generate a portion feature by comparing the procedure attribute for each of the at least one recipe step and the sensing information corresponding to each of the at least one recipe step during a time period, the feature capturing circuit calculating a deviation level between the setpoints and the sensing values during the time period and setting a characteristic value corresponding to the deviation level;
the portion feature being the deviation level between procedure attribute for each of the at least one recipe step and the sensing information during the time period;
a trend determination circuit coupled to the feature capturing circuit and configured to establish a trend distribution according to the portion feature of the process flows; and
a warning circuit coupled to the trend determination circuit and configured to determine whether to output a warning message according to the trend distribution.

11. The measurement device according to claim 10, wherein when the attribute analysis circuit determines that the procedure attribute is either the rising attribute or the falling attribute, the feature capturing circuit calculates an average deviation of deviations between the setpoints and the sensing values during the time period and sets the average deviation as the characteristic value corresponding to the deviation level.

12. The measurement device according to claim 10, wherein when the attribute analysis circuit determines that the procedure attribute is either the rising to steady state attribute or the falling to steady state attribute, the feature capturing circuit calculates a maximum deviation among the deviations between the setpoints and the sensing values during the time period and sets the maximum deviation as the characteristic value corresponding to the deviation level.

13. The measurement device according to claim 10, wherein when the attribute analysis circuit determines that the procedure attribute is either the rising to steady state attribute or the falling to steady state attribute, the feature capturing circuit calculates a deviation time, which corresponds to the deviations larger than a threshold during the time period, and sets the deviation time as the characteristic value corresponding to the deviation level.

14. The measurement device according to claim 10, wherein the process flows are related to a same cluster obtained by performing a clustering algorithm to process flows of process runs.

15. The measurement device according to claim 14, wherein the trend determination circuit performs a smoothing process to the characteristic value to obtain first trend values and obtains the trend distribution and a warning threshold corresponding to the trend distribution according to the first trend values.

16. The measurement device according to claim 15, wherein the trend determination circuit performs the smoothing process to the characteristic value to obtain the first trend values of various types, performs a space transformation to the first trend values to obtain second trend values that correspond to principal components respectively, performs a dimensionality reduction to the second trend values of the principal components to obtain third trend values, and obtains the trend distribution according to the third trend values.

17. The measurement device according to claim 16, wherein the warning circuit generates a warning threshold according to the trend distribution and compares the trend distribution with the warning threshold to determine whether to output the warning message.

18. The measurement device according to claim 17, further comprising:
   an interface presenting circuit coupled to the trend determination circuit and the warning circuit and configured to display a clustering diagram, the trend distribution, the warning threshold, the characteristic value, the first trend values, the second trend values, the third trend values or the warning message related to the cluster in an interface.

* * * * *